Nov. 27, 1956 — J. V. MEYERS ET AL — 2,771,820
KEYWAY CUTTING MACHINE
Filed Sept. 15, 1953 — 2 Sheets-Sheet 1
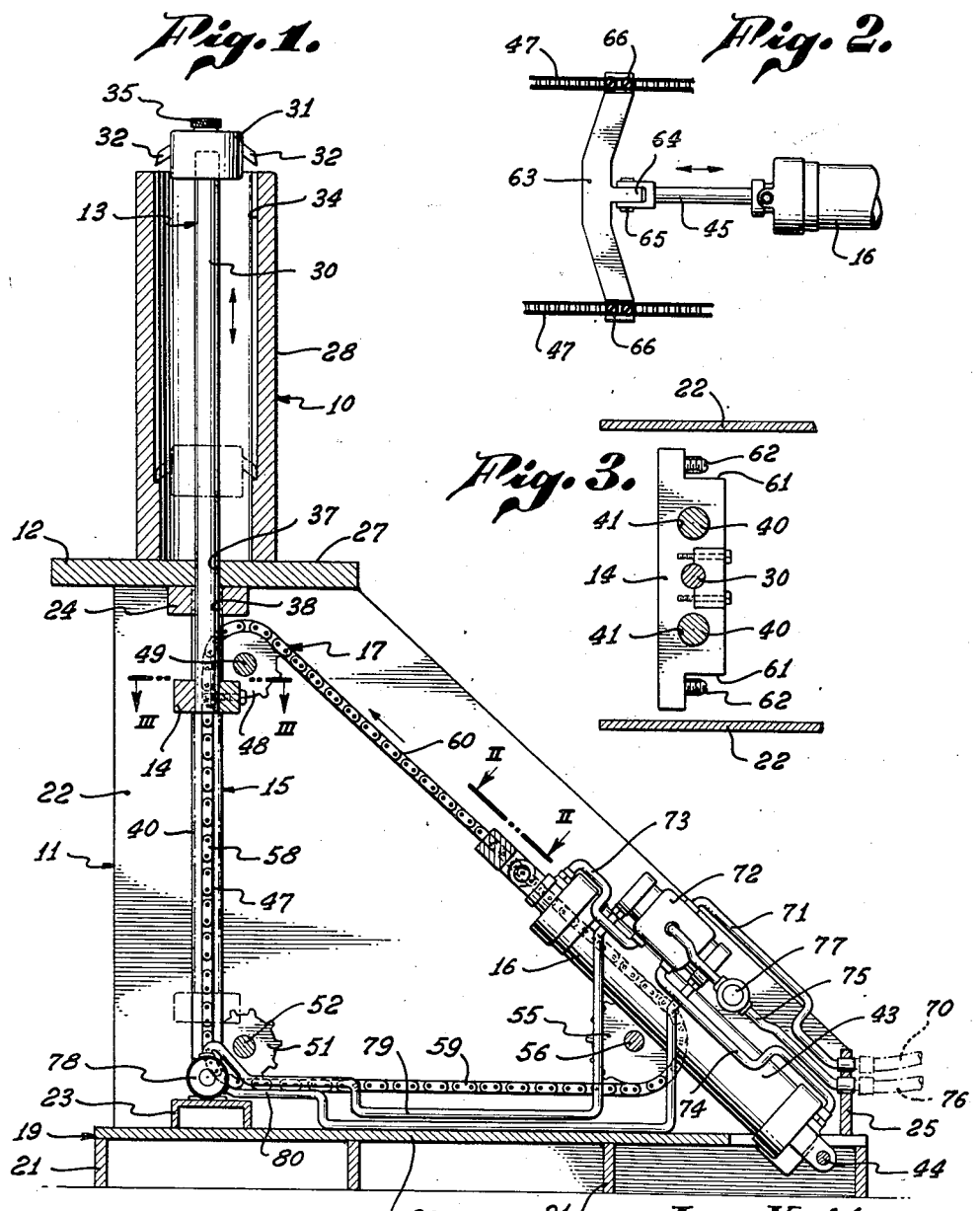
JOHN V. MEYERS,
ALGER W. PHILLIPS,
INVENTORS.
BY
ATTORNEY.

Nov. 27, 1956
J. V. MEYERS ET AL
2,771,820
KEYWAY CUTTING MACHINE
Filed Sept. 15, 1953
2 Sheets-Sheet 2
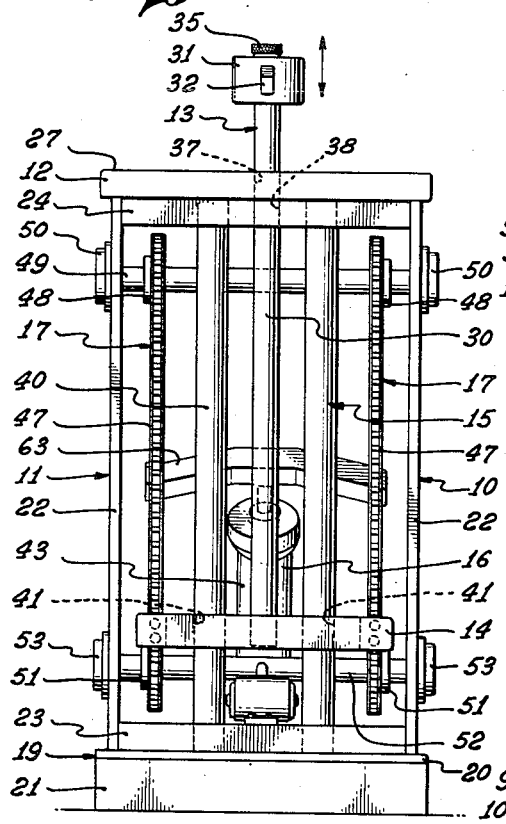
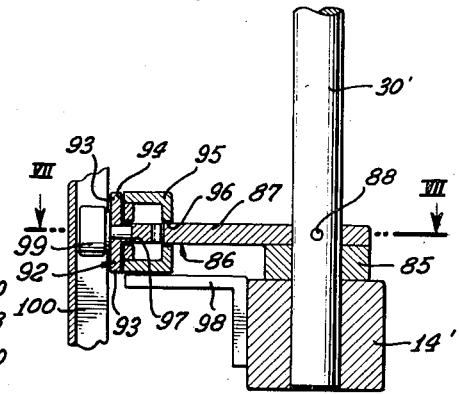
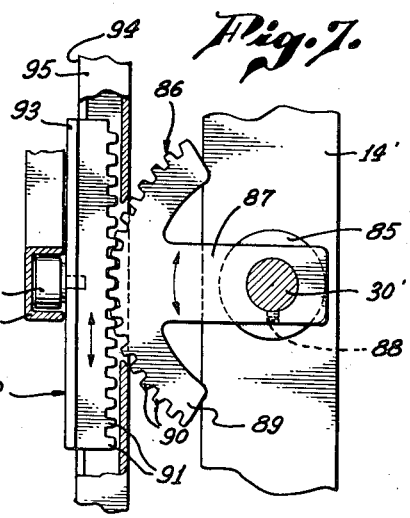
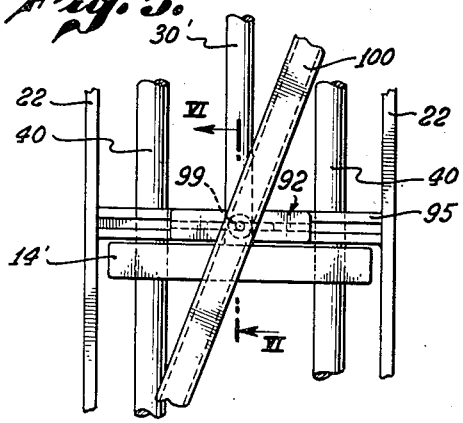
JOHN V. MEYERS,
ALGER W. PHILLIPS,
INVENTORS.
BY
ATTORNEY.

United States Patent Office 2,771,820
Patented Nov. 27, 1956

2,771,820

KEYWAY CUTTING MACHINE

John V. Meyers, Upland, and Alger W. Phillips, Pomona, Calif., assignors to Meyers-Phillips Company, Pomona, Calif., a partnership Application September 15, 1953, Serial No. 380,296

6 Claims. (Cl. 90—43)

This invention relates to a machine for cutting keyways of selected configuration in internal surfaces of a hollow work piece. In particular, this invention is related to a vertical recpirocal keyway cutting machine for use in cutting one or more longitudinally extending slots in a work piece and adapted to also cut spiral slots or rifling in a work piece.

Prior proposed machines for cutting keyways of vertical reciprocal type have included a cutter bar vertically reciprocally movable by means of driven rack members. The rate of movement of the cutter bar during its vertical stroke was usually not varied or controlled. At the end of the stroke the direction of movement of the bar was reversed by means of reversible clutch means which caused a sharp change of direction. The use of such reversible clutches and rack bars did not permit flexibility in the operation of such prior proposed machine and extremely little control of the rate of reciprocation was a definite disadvantage when cutting other than the simplest form of keyway. As a result keyways or slots which were cut into internal surfaces of a work piece by such prior machines were difficult to hold to the desired tolerances and many pieces were rejected as unsatisfactory because of excessive tolerance in the keyway.

This invention contemplates a novel arrangement of a vertical type keyway cutting machine which is compact in form and which occupies a minimum of vertical height while permitting cutting of keyways of selected length accurately and to closely held tolerances. The space advantage of this machine is accomplished by arranging the power means, for vertically reciprocally moving the cutter bar, rearwardly of the plane of movement of the cutter bar. The invention contemplates a means for mounting the cutter bar so that spiral slots, rifling, or virtually any internal configuration desired may be cut in internal surfaces of a work piece. The machine of this invention contemplates control means whereby the rate of movement of the cutter bar may be accurately controlled and regulated so that the desired slot may be readily held to the required tolerances.

The primary object of this invention, therefore, is to disclose and provide an improved machine for cutting slots, keyways, splines, rifling, and the like in internal surfaces of a hollow work piece.

An object of this invention is to disclose and provide a machine for cutting desired keyways in a work piece wherein the machine is readily adapted to cutting longitudinally extending keyways and spiral keyways.

Another object of this invention is to disclose and provide a machine for cutting keyways in a work piece wherein a minimum of vertical space for the machine is required.

A further object of this invention is to disclose and provide such a key seating machine wherein the power means for vertically reciprocally driving the cutting means is arranged in a new and novel manner with respect to the cutting means.

A still further object of this invention is to disclose and provide a machine having the advantages described above wherein the rate of movement of the cutting means may be readily controlled.

This invention contemplates a machine for cutting keyways of selected configuration wherein the cutting action is performed on a down or pull stroke of the cutting means, such an arrangement being sometimes referred to as a pull type of cutting machine. The particular connection of the power means to the cutting means provides uniform force application to downward movement of the cutting means and this particular arrangement permits a stroke of maximum length for the cutting means and the handling of work pieces of greater length as desired.

Other objects and advantages of this invention will be readily apparent from the following description of the drawings in which an exemplary embodiment of this invention is shown:

In the drawings:

Fig. 1 is a sectional view of a machine embodying this invention, the section being taken in a vertical plane virtually bisecting the machine.

Fig. 2 is a fragmentary plan view taken from the plane indicated by line II—II of Fig. 1.

Fig. 3 is a partial transverse sectional view taken in the plane indicated by line III—III of Fig. 1.

Fig. 4 is a front view of the machine shown in Fig. 1 with the cutting means in down position.

Fig. 5 is a fragmentary front view of a modification of the machine shown in Fig. 1 for cutting spiral grooves or riflings.

Fig. 6 is a fragmentary sectional view taken in the plane indicated by line VI—VI of Fig. 5.

Fig. 7 is a fragmentary sectional view taken in the plane indicated by line VII—VII of Fig. 6.

Generally speaking, an exemplary machine illustrating this invention, generally indicated at 10, comprises a frame means 11 having a ported horizontal work support or table 12, a cutter means 13 extending through the table and including a cross head 14 vertically guided by guide column means 15. Power means 16 rearwardly of the cross head is connected to the cross head by sprocket and endless chain means 17 whereby the cutting means 13 may be vertically reciprocally moved in a vertical plane adjacent to the front of the machine.

In Figs. 1 and 4 the frame means 11 may comprise a base frame member 19 comprising a horizontal plate 20 and a plurality of spaced vertical reinforcing legs 21. Side plates 22 generally triangularly formed may extend upwardly from side margins of plate 20 and may be secured thereto as by welding. An inverted front transverse channel member 23 may extend between bottom portions of side plates 22 and may be secured thereto in any suitable manner. The top of side plates 22 may support the horizontal work support or table 12, the height of the work table 12 being selected so as to afford a suitable length of stroke for the cutting means 13. The side walls and work table 12 may be reinforced by a horizontal transverse member 24 secured thereto as by welding. The rear portions of triangular side walls 22 may be interconnected by a transverse rear member 25. It is understood a frame means of any suitable construction utilizing different structural members may be employed.

The work table 12 is provided with a suitable horizontal top surface 27 upon which may be positioned and secured work piece 28 in which a longitudinally extending slot or keyway groove is to be cut in the internal surfaces thereof. Means for securing work piece 28 to the work table are not shown because such means are well known to the art and are not part of this invention. It will be noted that the work piece 28 is hollow and is supported vertically with the axis of the work piece and the axis of cutter means 13 in co-axial relation.

The cutting means 13 may comprise a cutter bar 30 adapted to carry at its top a cutting head means 31. The cutting head means 31 is provided with one or more adjustable cutter elements 32 for cutting a selected keyway 34 in internal surfaces of work piece 28. The cutting head means 31 includes an adjustable knob 35 which may be turned by an operator for regulating the setting of the cutter elements 32. The outer diameter of the cutting head means 31 is less than the inner diameter of the bore of the work piece 28 so that the cutting head means may be reciprocally movable within the work piece 28.

The cutter bar 30 extends downwardly through guide ports 37 and 38 in the work table 12 and transverse member 24 respectively. The lower end of the cutter bar 30 may be secured in fixed relation, in this embodiment, to the cross head 14. The fixed connection between the lower end of the cutter bar and the cross head may be of any suitable well-known construction.

The cross head 14 extends transversely and horizontally between side walls 22 and in a transverse vertical plane which includes the axis of cutter bar 30. Means guiding the cutter bar in its vertical reciprocal movement may include a pair of transversely spaced guide columns 40 which extend between and are connected to the bottom member 23 and the top member 24. The guide columns 40 are preferably of smoothly finished round metal stock and are slidably received within a pair of spaced openings 41 in the cross head 14 so that the cross head 14 may be vertically slidable upon said parallel columns 40. The pair of columns 40 are equally spaced from the axis of the cutter means 13 and the axes of the columns lie in the same plane as the axis of the cutter means.

Means for vertically reciprocally moving cutter means 13 comprises a pair of laterally spaced triangularly arranged endless chain and sprocket means 17 and the power means 16 which is located rearwardly of the vertical plane of movement of the cutter means 30 and cross head 14. The power means 16 may comprise a double acting piston means including a piston cylinder 43 fixed at its bottom end as at 44 to the base member 19 adjacent the rear end thereof. The cylinder 43 is positioned with its axis upwardly and forwardly inclined. A piston rod 45 is reciprocally movable along cylinder axis upon actuation of the power means.

The chain and sprocket means 17 comprises a pair of triangularly arranged endless chains 47. Chains 47 are supported by top sprockets 48 carried by transversely extending shaft 49 journably mounted in the side walls 22 by suitable means indicated at 50. The axis of said shaft 49 lies slightly rearwardly of the plane of the axis of the guide columns and cutter means 30. Bottom sprockets 51 may be carried by a transverse shaft 52 located beneath shaft 49 and slightly above transverse member 23. The shaft 52 may be journaled in side walls 22 by journal means 53. Rear sprockets 55 are carried by a transverse shaft 56 which has its axis lying in the same horizontal plane as the axis of shaft 52. The shaft 56 lies slightly beneath cylinder 43 and may be journaled in the side walls 22 in a manner similar to that described for shafts 52 and 49. Each triangularly arranged chain 47 is thus supported with a vertical lay 58 lying in the plane including the axes of the guide columns 40 and cutter means 30, a bottom horizontal lay 59 extending rearwardly from the vertical lay 58 and forming a right angle therewith, and a rearwardly and downwardly inclined lay 60 lying in a plane including the axis of the piston rod 45. The length of vertical and horizontal lays 58 and 59 may be substantially equal.

The vertical lays 58 of the chains 47 may be connected to respective ends of the cross head 14 in notches 61 formed in said ends and by any suitable securing means such as screw bolts 62. The piston rod 45 may be connected to each chain means 47 along the inclined lay 60 by means of a transversely extending yoke 63 having a rearwardly extending central lug 64 pivotally connected as at 65 to the end of piston rod 45. Opposite end portions of yoke 63 may be secured to the chain means 47 in any suitable manner as exemplarily illustrated as by bolt and nut assemblies 66.

The piston means 16 may be actuated by any suitable fluid such as air or oil. A suitable supply or reservoir of oil (not shown) may be provided and a motor and pump (not shown) for pumping said fluid from the reservoir to the cylinder 43 may be also provided. Supply line 70 may carry pumped fluid to a tube 71 which leads to a four-way valve 72 of well-known form. The four-way valve 72 is provided with a pair of outlets 73 and 74 leading respectively, to the top and bottom end portions of cylinder 43. A return tube 75 may carry fluid from valve 72 through a return line 76 to the reservoir. A throttle valve 77 may be provided in the tube 75 for regulating flow of the fluid to the reservoir and pump.

The four-way valve 72 is controlled by a pilot valve 78 located at the front of the machine and within convenient reach of an operator. The pilot valve 78 is connected to the four-way valve by means of a pair of ducts 79 and 80, said ducts 79 and 80 entering the four-way valve at opposite ends thereof. The four-way valve is so constructed that operation of the pilot valve 78 will control pressures on opposite sides of the piston within cylinder 43 so that extension and retraction of piston rod 45 may be smoothly, accurately, and carefully controlled. The particular construction of the four-way valve pilot valve and power means is well-known in the art and it not explained in detail herein.

In operation a work piece 28 may be secured in well-known manner to the work table 12 with the axis of the work piece in alignment with the axis of the cutting means 13. The cutter bar 30 may be fully extended so that cutter elements 32 are positioned above work piece 38. The cutting head means 31 may be adjusted so as to shave a selected amount of metal from the internal surface of the work piece to begin cutting a keyway therein. By operating the pilot valve the pressure on opposite sides of the piston head in the cylinder 43 may be varied so as to cause the piston rod to move upwardly at a selected rate of movement along the upwardly inclined plane of lays 60 of the chain means. Extension of the piston rod 45 causes the sprocket and chain means to pull the cutting means 13 downwardly into cutting engagement with the internal surface of the work piece. The return movement of the cutting means 13 may be controlled by the pilot valve after the desired length of cut has been made in the metal. The piston rod 45 may then be retracted so as to cause the cutting means 13 to be elevated out of engagement with the work piece for making a second cut therein. Automatic means including solenoid actuated valves may be provided for reciprocating the cutter means and for adjusting the cutting head means after each stroke.

It will be thus readily apparent that the particular arrangement of the sprocket and chain means 17, the power means 16, and the cutting means 13 provides a compact keyway cutting machine which occupies a minimum of floor space and vertical height, and which does not require special floor construction or special work platforms for an operator. At the same time the cutting of keyways in the work piece may be held to very close tolerances because of the positive guiding of the cutting means and the accurate control of the rate of movement of the cutting means.

In the modification shown in Fig. 5, 6 and 7, an arrangement is illustrated whereby the cutting means 13 may be rotated during its downward movement for accurately cutting spiral grooves or rifling in the bore of a work piece. In this modification the cutter bar 30' may be rotatably mounted on the cross head 14' by a bearing means 85. Above the bearing means 85 may be provided a curved rack means 86 including an arm 87 fixed to the cutter bar 30' as by a pin 88. The arm 87 carries forwardly of the cutter bar 30' a curved, horizontal portion 89 provided with a plurality of teeth 90 arranged in a suitably selected arc or curve. The teeth 90 of the curved rack means 86 mesh with teeth 91 of a straight, horizontal rack member 92.

The straight rack member 92 includes vertical guide flanges 93 which slide along front edge faces 94 of a housing 95. The housing 95 is provided with longitudinally extending horizontal slots 96 and 97 which are adapted to receive the meshing portions of the straight rack member 92 and the curved rack means 86. The housing 95 may be supported from the cross head 14' by a suitable angle bracket 98.

The straight rack member 92 carries a centrally located roller 99 which is adapted to rollingly engage an accurately machined surface on a sine bar 100. The sine bar 100 extends diagonally between the base of the machine and the work table of the machine at the front thereof and may be secured thereto at a selected angle to the vertical axis of the cutting means 13 in any well-known manner.

It will thus be apparent that engagement of the roller 99 with sine bar 100 as the cutter bar 30' is pulled downwardly by the sprocket and chain means moves the straight rack member 92 laterally with respect to the axis of the cutter means and will cause the curved rack means 86 to rotate through a selected angle. The cutting elements carried by the cutter bar are thus incrementally rotated in correlation with downward movement of the cutter bar and will cut a selected spiral groove in the internal surface of the work piece.

It will thus be apparent that by rotatably mounting the cutter bar on the cross head for transmitting to the cutter bar selected rotational forces during movement of the cutter bar provides a key seating machine which is extremely flexible in operation and which can conveniently cut virtually any shape or configuration in internal surfaces of a work piece.

It is understood that various modifications and changes may be made in the above described machine which come within the spirit of this invention and all such changes and modifications coming within the scope of the appended claims are embraced thereby.

We claim:

1. In a fluid operable keyway cutting machine, the combination of: frame means including a ported work piece support and a frame member spaced therebelow; laterally spaced vertical guide columns connecting the support and frame member; crosshead means provided with spaced openings slidably receiving said guide columns; cutter means carried by the cross head means between said guide columns and extending through said ported work support for cutting engagement with a workpiece supported thereby; means for reciprocally moving said crosshead means and said cutter means comprising a forwardly and upwardly inclined fluid operated piston means carried by the frame member rearwardly of the crosshead means and spaced therefrom; and a pair of triangularly arranged sprocket and endless chain means disposed on opposite sides of the piston means and the crosshead means, each of said chain means having a portion lying in the plane defined by the axis of the cutter means and guide columns and connected to said crosshead means outwardly of the guide columns, and an inclined portion lying parallel to axis of the piston means, and yoke means connecting the piston means and the inclined portions of said chain means for causing axial movement of said cutter means.

2. In a machine as stated in claim 1 wherein control means are connected to said piston means for regulating the stroke of said cutter means.

3. In a machine as stated in claim 1, wherein said cutter means includes a cutter bar, means rotatably mounting the cutter bar on said crosshead means; and means carried by said frame means and means on said crosshead cooperable for selectively turning said cutter bar as the bar is moved.

4. In a fluid operable machine for cutting selected keyways in internal surfaces of a workpiece, the combination of: a horizontal ported work table adapted to support a workpiece vertically; a cutter bar vertically, reciprocally movable through the ported work table; a vertically movable crosshead below the table connected to the lower end of the cutter bar; means for guiding said crosshead and cutter bar in said vertical movement; means for driving said crosshead and cutter bar including a first pair of sprockets mounted below and adjacent to the work table, a second pair of sprockets mounted beneath and in spaced relation to said first pair of sprockets, chain means including vertically disposed lays extending between said sprockets and connected to the crosshead in a plane defined by the axis of said cutter bar, and fluid operable power means connected to the chain means; and means for rotatably mounting the cutter bar on the crosshead and comprising a curved, transversely disposed, toothed segment bar fixed to the cutter bar, a straight, transversely disposed rack bar carried by the crosshead in engagement with the curved bar and provided with a centrally disposed guide roller, and a diagonally arranged guide member carried by the work table guidably engaging said roller for turning the cutter bar in vertical movement of the crosshead.

5. In a fluid operable machine for cutting selected keyways in internal surfaces of a workpiece, the combination of: a horizontal ported work table adapted to support a workpiece vertically; a cutter bar vertically, reciprocally movable through the ported work table; a vertically movable crosshead below the table connected to the lower end of the cutter bar; means for guiding said crosshead and cutter bar in said vertical movement; means for driving said crosshead and cutter bar including a first pair of sprockets mounted below and adjacent to the work table, a second pair of sprockets mounted beneath and in spaced relation to said first pair of sprockets, chain means including vertically disposed lays extending between said sprockets and connected to the crosshead in a plane defined by the axis of said cutter bar, and fluid operable power means connected to the chain means; and means to selectively turn the cutter bar comprising a sine bar carried by the work table and means carried by the crosshead in engagement with means connected to the cutter bar for turning the cutter bar.

6. In a fluid operable keyway cutting machine, the combination of: frame means including a ported workpiece support and a frame member spaced therebelow; laterally spaced guide columns connecting the support and frame member; crosshead means provided with spaced openings slidably receiving said guide columns; cutter means centrally carried by the crosshead means between said guide columns and extending through said ported work support for cutting engagement with a workpiece supported thereby; means for reciprocally moving said crosshead means and said cutter means comprising a fluid operable means spaced from the crosshead means; a pair of sprocket and endless chain means arranged on opposite sides of the fluid operable means and the crosshead means, each chain means having a portion lying parallel to the axis of the cutter means and guide columns and connected to the crosshead means; and means connecting fluid operable means to each chain means for causing axial reciprocal movement of the cutter means.

References Cited in the file of this patent

UNITED STATES PATENTS

| | | |
|---|---|---|
| 175,142 | North | Mar. 21, 1876 |
| 540,095 | Giesler et al. | May 28, 1895 |
| 1,408,735 | Heisler | Mar. 7, 1922 |
| 1,438,324 | Miller | Dec. 12, 1922 |
| 1,714,345 | Brennan et al. | May 21, 1929 |
| 2,656,859 | Retz | Oct. 27, 1953 |